United States Patent
Mizuguchi

(10) Patent No.: US 7,663,802 B2
(45) Date of Patent: Feb. 16, 2010

(54) ZOOM LENS SYSTEM WITH VIBRATION REDUCTION FUNCTION

(75) Inventor: Keiko Mizuguchi, Kawasaki (JP)

(73) Assignee: Nikon Corporation, Tokyo (JP)

( * ) Notice: Subject to any disclaimer, the term of this patent is extended or adjusted under 35 U.S.C. 154(b) by 285 days.

(21) Appl. No.: 11/700,925

(22) Filed: Feb. 1, 2007

(65) Prior Publication Data

US 2007/0183042 A1 Aug. 9, 2007

(30) Foreign Application Priority Data

Feb. 3, 2006 (JP) .............................. 2006-027323

(51) Int. Cl.
*G02B 27/64* (2006.01)
*G02B 15/14* (2006.01)

(52) U.S. Cl. .................. 359/557; 359/690; 359/554; 359/676

(58) Field of Classification Search ......... 359/554–557, 359/676–690; 396/52–55
See application file for complete search history.

(56) References Cited

U.S. PATENT DOCUMENTS

| 5,654,826 | A | * | 8/1997 | Suzuki | 359/557 |
| 5,731,897 | A | * | 3/1998 | Suzuki | 359/557 |
| 5,841,588 | A | | 11/1998 | Suzuki et al. | |
| 6,115,188 | A | * | 9/2000 | Nishio et al. | 359/690 |
| 6,124,972 | A | | 9/2000 | Hayakawa et al. | |
| 6,373,639 | B2 | | 4/2002 | Hayakawa et al. | |
| 6,563,643 | B2 | | 5/2003 | Hayakawa et al. | |
| 6,646,803 | B2 | | 11/2003 | Hayakawa et al. | |
| 2005/0219708 | A1 | | 10/2005 | Shibayama et al. | |
| 2006/0215279 | A1 | | 9/2006 | Shibayama | |
| 2006/0245079 | A1 | | 11/2006 | Yamamoto et al. | |

FOREIGN PATENT DOCUMENTS

JP 8-62541 A 3/1996
JP 10-133114 A 5/1998

* cited by examiner

*Primary Examiner*—Thong Nguyen
(74) *Attorney, Agent, or Firm*—Miles & Stockbridge P.C.

(57) ABSTRACT

A compact zoom lens system has a zoom ratio of about 3.5 or more, an angle of view of 29° or more in a wide-angle end, and a vibration reduction function. The system includes, in order from an object, a first group having positive power, a second group having negative power, and a third group having positive power. Upon zooming from a wide-angle end to a telephoto end, a distance between the first and second groups increases, and a distance between the second and third groups decreases. The third group consists of, in order from the object, a 31 group having positive power, a 32 group having negative power, and a 33 group. Only the 32 group is moved perpendicularly to an optical axis for correcting image blur due to camera shake.

17 Claims, 13 Drawing Sheets

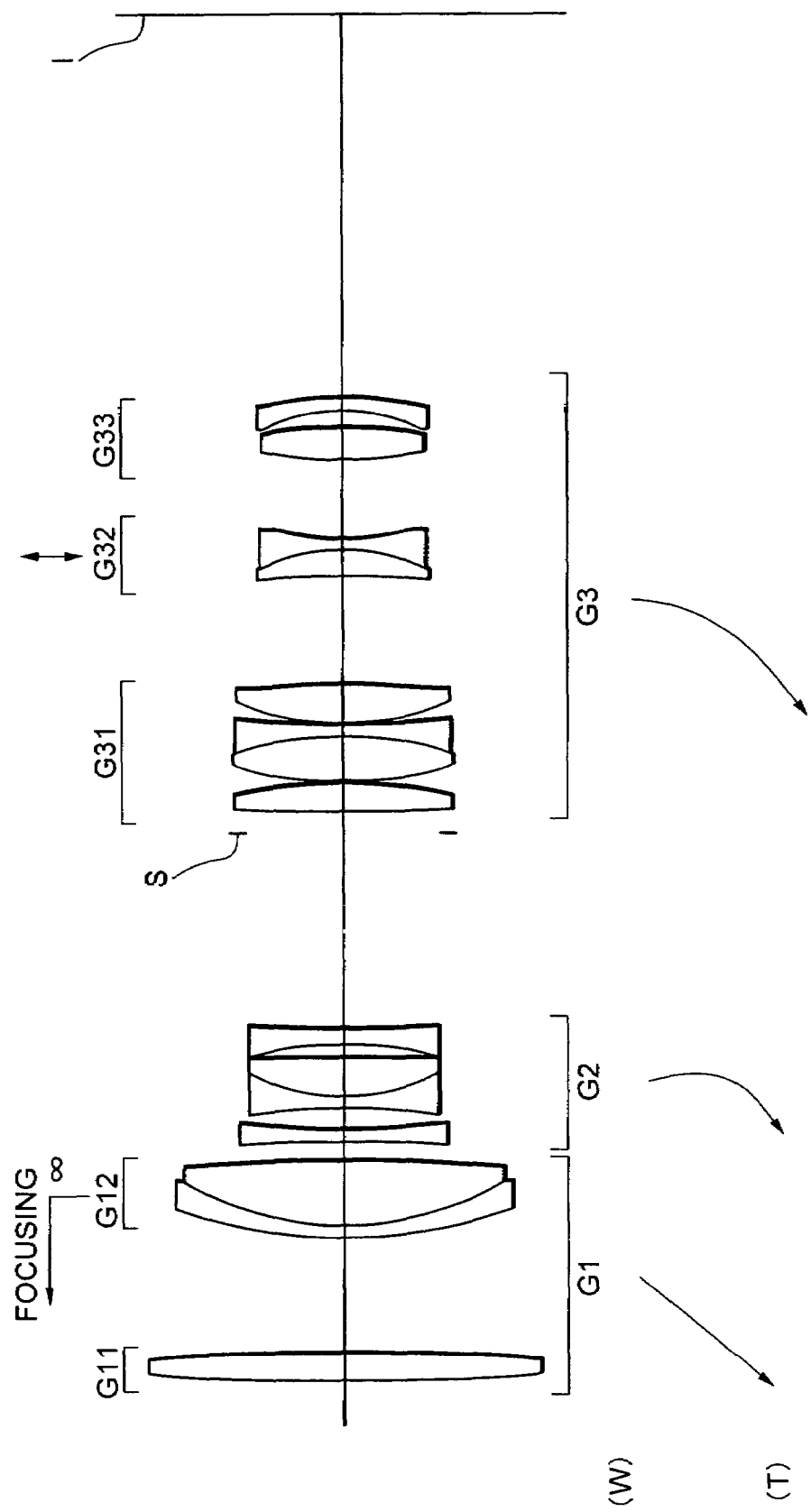

ZOOM LENS SYSTEM WITH VIBRATION REDUCTION FUNCTION

The disclosure of the following priority application is herein incorporated by reference:

Japanese Patent Application No. 2006-027323 filed on Feb. 3, 2006.

BACKGROUND OF THE INVENTION

1. Field of the Invention

The present invention relates to a zoom lens system suitable for a single-lens reflex camera using a film or a solid-state imaging device.

2. Related Background Art

There have been proposed zoom lens systems having a vibration reduction function with a zoom ratio of about four in such as Japanese Paten Application Laid-Open Nos. 8-62541 and 10-133114.

Examples disclosed in Japanese Patent Application Laid-Open No. 8-62541 are a positive-negative-positive-positive-negative five-lens-group zoom lens system or a positive-negative-positive-negative-positive-negative six-lens-group zoom lens system, in which a second lens group with negative refractive power is moved for vibration reduction.

An example disclosed in Japanese Patent

Application Laid-Open No. 10-133114 is a positive-negative-negative-positive-negative five-lens-group zoom lens system in which a portion of a fourth lens group with positive refractive power is moved for vibration reduction.

However, in any one of disclosed examples, an effective diameter of a vibration reduction lens group is large about 25 mm or more, so that a vibration reduction mechanism becomes large. Accordingly, it becomes difficult to make the zoom lens system small. Moreover, the number of lens groups of a zoom lens system is five or more, so that a zooming mechanism becomes complicated.

SUMMARY OF THE INVENTION

The present invention is made in view of the aforementioned problems and has an object to provide a compact zoom lens system suitable for a single-lens reflex camera using a solid-state imaging device, having a zoom ratio of about 3.5 or more, an angle of view of 29 degrees or more in a wide-angle end state, and a vibration reduction function.

According to a first aspect of the present invention, there is provided a zoom lens system with a vibration reduction function including, in order from an object, a first lens group having positive refractive power, a second lens group having negative refractive power, and a third lens group having positive refractive power. Upon zooming from a wide-angle end state to a telephoto end state, a distance between the first lens group and the second lens group increases, and a distance between the second lens group and the third lens group decreases. The third lens group includes, in order from the object, a 31 lens group (first lens sub-group) having positive refractive power, a 32 lens group (second lens sub-group) having negative refractive power, and a 33 lens group (third lens sub-group). Only the 32 lens group is moved in a direction perpendicular to an optical axis for correcting an image blur on an image plane upon generating a camera shake. The following conditional expression (1) is satisfied:

$$0.7 < d31/d32 < 1.69 \tag{1}$$

where d31 denotes a distance between the 31 lens group and the 32 lens group, and d32 denotes a distance between the 32 lens group and the 33 lens group.

In the first aspect of the present invention, it is preferable that upon zooming from the wide-angle end state to the telephoto end state, the first and third lens groups are moved to the object side.

In the first aspect of the present invention, the following conditional expression (2) is preferably satisfied:

$$-4.5 < f1/f2 < -2.0 \tag{2}$$

where f1 denotes a focal length of the first lens group, and f2 denotes a focal length of the second lens group.

In the first aspect of the present invention, the following conditional expression (3) is preferably satisfied:

$$2.0 < f1/f3 < 4.0 \tag{3}$$

where f1 denotes a focal length of the first lens group, and f3 denotes a focal length of the third lens group.

In the first aspect of the present invention, it is preferable that the first lens group includes, in order from the object, an 11 lens group (first lens sub-group) having positive refractive power, and a 12 lens group (second lens sub-group) having positive refractive power, and focusing from infinity to a close object is carried out by moving only the 12 lens group to the object side, and the following conditional expression (4) is preferably satisfied:

$$1.1 < ft/f12 < 2.0 \tag{4}$$

where ft denotes a focal length of the zoom lens system in the telephoto end state, and f12 denotes a focal length of the 12 lens group.

In the first aspect of the present invention, the following conditional expression (5) is preferably satisfied:

$$-2.0 < f32/f33 < -0.8 \tag{5}$$

where f32 denotes a focal length of the 32 lens group, and f33 denotes a focal length of the 33 lens group.

In the first aspect of the present invention, the following conditional expression (6) is preferably satisfied:

$$0 < f3/f33 < 0.5 \tag{6}$$

where f3 denotes a focal length of the third lens group, and f33 denotes a focal length of the 33 lens group.

In the first aspect of the present invention, it is preferable that an aperture stop is disposed in the vicinity of the third lens group including in the third lens group.

In the first aspect of the present invention, it is preferable that each lens surface is formed by a spherical surface or a plane surface.

According to a second aspect of the present invention, there is provided an imaging apparatus using the zoom lens system with a vibration reduction function according to any of the first aspect.

According to a third aspect of the present invention, there is provided a method for forming an image of an object, varying a focal length, and correcting an image blur of a zoom lens system with a vibration reduction function, the method comprising steps of: providing a zoom lens system that includes, in order from an object, a first lens group having positive refractive power, a second lens group having negative refractive power, and a third lens group having positive refractive power; varying a focal length from a wide-angle end state to a telephoto end state by increasing a distance between the first lens group and the second lens group, and decreasing a distance between the second lens group and the third lens group; providing the third lens group that comprises, in order from the object, a 31 lens group having positive refractive power, a 32 lens group having negative refractive power, and a 33 lens group; correcting an image blur on an image plane upon generating a camera shake by moving only the 32 lens group in a direction perpendicular to an optical axis; and satisfying the following conditional expression (1):

$$0.7 < d31/d32 < 1.69 \quad (1)$$

where d31 denotes a distance between the 31 lens group and the 32 lens group, and d32 denotes a distance between the 32 lens group and the 33 lens group.

Other features and advantages according to the present invention will be readily understood from the detailed description of the most preferred embodiments in conjunction with the accompanying drawings.

BRIEF DESCRIPTION OF THE DRAWINGS

FIGS. 3A and 3B are graphs showing various aberrations of the zoom lens system with a vibration reduction function according to Example 1 in a wide-angle end state focusing on infinity in which FIG. 3A shows various aberrations without carrying out vibration reduction, and FIG. 3B shows coma upon correcting a rotational camera shake of 0.30 degrees.

FIGS. 5A and 5B are graphs showing various aberrations of the zoom lens system with a vibration reduction function according to Example 1 in a telephoto end state focusing on infinity in which FIG. 5A shows various aberrations without carrying out vibration reduction, and FIG. 5B shows coma upon correcting a rotational camera shake of 0.15 degrees.

FIG. 6 is a diagram showing a lens configuration of a zoom lens system with a vibration reduction function according to Example 2.

FIGS. 7A and 7B are graphs showing various aberrations of the zoom lens system with a vibration reduction function according to Example 2 in a wide-angle end state focusing on infinity in which FIG. 7A shows various aberrations without carrying out vibration reduction, and FIG. 7B shows coma upon correcting a rotational camera shake of 0.30 degrees.

FIGS. 9A and 9B are graphs showing various aberrations of the zoom lens system with a vibration reduction function according to Example 2 in a telephoto end state focusing on infinity in which FIG. 9A shows various aberrations without carrying out vibration reduction, and FIG. 9B shows coma upon correcting a rotational camera shake of 0.15 degrees.

FIGS. 11A and 11B are graphs showing various aberrations of the zoom lens system with a vibration reduction function according to Example 3 in a wide-angle end state focusing on infinity in which FIG. 11A shows various aberrations without carrying out vibration reduction, and FIG. 11B shows coma upon correcting a rotational camera shake of 0.30 degrees.

FIGS. 13A and 13B are graphs showing various aberrations of the zoom lens system with a vibration reduction function according to Example 3 in a telephoto end state focusing on infinity in which FIG. 13A shows various aberrations without carrying out vibration reduction, and FIG. 13B shows coma upon correcting a rotational camera shake of 0.15 degrees.

DESCRIPTION OF THE MOST PREFERRED EMBODIMENT

An imaging apparatus (single-lens reflex camera) equipped with a zoom lens system with a vibration reduction function according to the present application is explained below.

Figure 1:
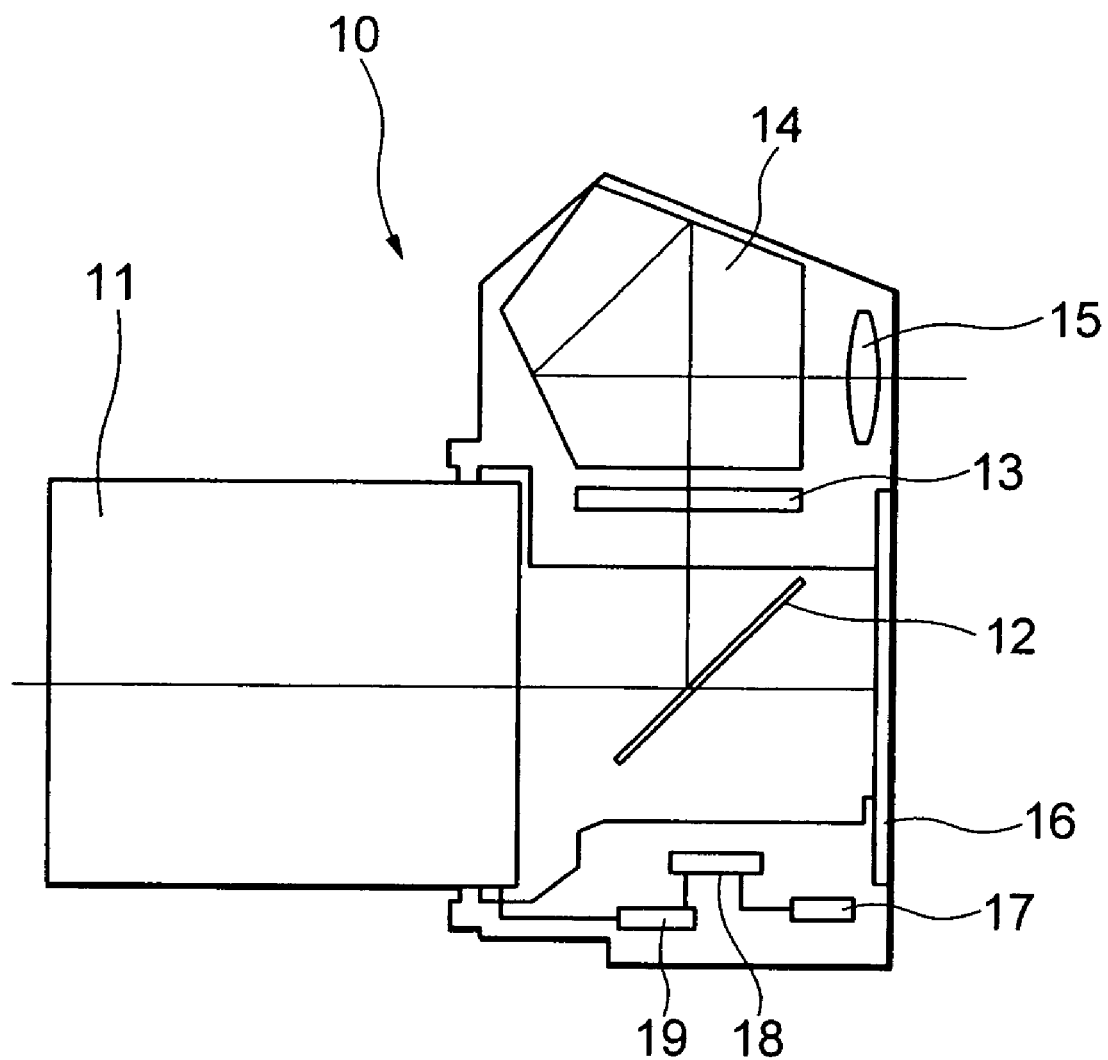
FIG. 1 is a schematic diagram showing an imaging apparatus using a zoom lens system with a vibration reduction function according to the present application.

FIG. 1 is a schematic diagram showing an imaging apparatus (a single-lens reflex camera) using the zoom lens system with a vibration reduction function described later according to the present application.

In FIG. 1, light coming out from a subject (not shown) is converged by a zoom lens system 11 with a vibration reduction function, which is explained later, reflected by a quick return mirror 12, and focused on a focusing screen 13. The subject image focused on the focusing screen 13 is reflected a plurality of times by a pentagonal roof prism 14, and observed by a photographer as an erected image through an eyepiece 15.

After fixing a picture composition with observing the subject image through the eyepiece 15 by half-pressing a release button (not shown), the photographer presses the release button all the way down. Upon pressing the release button all the way down, the quick return mirror 12 is flipped up, the light from the subject is detected by an imaging device 16, and a photographed image is captured and stored in a memory (not shown).

When the release button is pressed all the way down, a tilt of the camera 10 is detected by a sensor 17 such as an angular sensor stored in the imaging apparatus (a single-lens reflex camera) 10, and transmitted to a CPU 18. Then, an amount of a rotational camera shake is detected by the CPU 18, a lens driver 19 for driving a vibration reduction lens group in a direction perpendicular to the optical axis is driven, and an image blur on the imaging device 16 upon generating a camera shake is corrected. In this manner, the imaging apparatus 10 using the zoom lens system 11 with a vibration reduction function, which is explained later, is constructed.

Then, a zoom lens system with a vibration reduction function according to an embodiment is explained in detail.

A zoom lens system with a vibration reduction function according to the present embodiment includes, in order from an object, a first lens group having positive refractive power, a second lens group having negative refractive power, and a third lens group having positive refractive power. Upon zooming from a wide-angle end state to a telephoto end state, a distance between the first lens group and the second lens group increases, and a distance between the second lens group and the third lens group decreases. With this configuration, it becomes effective to simplify the zooming mechanism and to miniaturize the total lens length of the zoom lens system.

Moreover, the third lens group includes, in order from the object, a 31 lens group (first lens sub-group) having positive refractive power, a 32 lens group (second lens sub-group) having negative refractive power, and a 33 lens group (third lens sub-group). Upon generating a camera shake, an image blur on the image plane is corrected by moving only the 32 lens group in a direction perpendicular to the optical axis.

By constructing the 31 lens group having positive refractive power and the 32 lens group having negative refractive power, the effective diameter of the 32 lens group can be smaller than those of the first lens group through the 31 lens group. Accordingly, the vibration reduction mechanism can be compact, and it becomes effective to miniaturize the whole zoom lens system. Moreover, with constructing in this manner, deterioration of optical performance such as coma upon moving the 32 lens group in a direction perpendicular to the optical axis can be small.

In a zoom lens system with a vibration reduction function according to the present embodiment, the following conditional expression (1) is preferably satisfied:

$$0.7 < d31/d32 < 1.69 \quad (1)$$

where d31 denotes a distance between the 31 lens group and the 32 lens group, and d32 denotes a distance between the 32 lens group and the 33 lens group.

Conditional expression (1) defines an appropriate range of the position of the 32 lens group in the third lens group. When the ratio d31/d32 is equal to or exceeds the upper limit of conditional expression (1), the total lens length of the zoom lens system becomes large, and it becomes difficult to correct spherical aberration and coma. On the other hand, when the ratio d31/d32 is equal to or falls below the lower limit of conditional expression (1), the effective diameter of the 32 lens group becomes large, the vibration reduction mechanism becomes large, and it becomes difficult to correct spherical aberration and longitudinal chromatic aberration. In order to secure the effect of the present invention, it is preferable to set the lower limit of conditional expression (1) to 0.8. In order to secure the effect of the present invention, it is preferable to set the upper limit of conditional expression (1) to 1.6.

In a zoom lens system with a vibration reduction function according to the present embodiment, upon zooming from the wide-angle end state to the telephoto end state, the first lens group and the third lens group are preferably moved to the object side. With constructing in this manner, the total lens length of the zoom lens system in the wide-angle end state can be short, so that the zoom lens system can be compact.

In a zoom lens system with a vibration reduction function according to the present embodiment, the following conditional expressions (2) and (3) are preferably satisfied:

$$-4.5 < f1/f2 < -2.0 \quad (2)$$

$$2.0 < f1/f3 < 4.0 \quad (3)$$

where f1 denotes a focal length of the first lens group, f2 denotes a focal length of the second lens group, and f3 denotes a focal length of the third lens group.

Conditional expression (2) defines an appropriate range of the focal length of the second lens group. When the ratio f1/f2 is equal to or exceeds the upper limit of conditional expression (2), negative refractive power of the second lens group becomes weak, so that it becomes difficult to correct distortion and to obtain a zoom ratio of about 3.5. On the other hand, when the ratio f1/f2 is equal to or falls below the lower limit of conditional expression (2), negative refractive power of the second lens group becomes large, so that it becomes difficult to correct various aberrations such as spherical aberration and the like. In order to secure the effect of the present invention, it is preferable to set the lower limit of conditional expression (2) to −4.05. In order to secure the effect of the present invention, it is preferable to set the upper limit of conditional expression (2) to −2.5.

Conditional expression (3) defines an appropriate range of a focal length of the third lens group. When the ratio f1/f3 is equal to or exceeds the upper limit of conditional expression (3), refractive power of the third lens group becomes large, so that it becomes difficult to correct coma and distortion. On the other hand, when the ratio f1/f3 is equal to or falls below the lower limit of conditional expression (3), refractive power of the third lens group becomes small, so that it becomes difficult to correct various aberrations such as spherical aberration. In order to secure the effect of the present invention, it is preferable to set the lower limit of conditional expression (3) to 2.5. In order to secure the effect of the present invention, it is preferable to set the upper limit of conditional expression (3) to 3.1.

In a zoom lens system with a vibration reduction function according to the present embodiment, the first lens group includes, in order from the object, an 11 lens group (first lens sub-group) having positive refractive power, and a 12 lens group (second lens sub-group). Upon focusing from infinity to a close object, only the 12 lens group is moved to the object side. With constructing in this manner, the focusing lens can be lightened, so that it is advantageous to make autofocus faster.

In a zoom lens system with a vibration reduction function according to the present embodiment, the following conditional expression (4) is preferably satisfied:

$$1.1 < ft/f12 < 2.0 \quad (4)$$

where ft denotes a focal length of the zoom lens system in the telephoto end state, and f12 denotes a focal length of the 12 lens group.

Conditional expression (4) defines an appropriate range of the focal length of the 12 lens group. When the ratio ft/f12 is equal to or exceeds the upper limit of conditional expression (4), refractive power of the 12 lens group becomes large, and variation in aberrations such as coma upon focusing becomes large, so that it is undesirable. On the other hand, when the ratio ft/f12 is equal to or falls below the lower limit of conditional expression (4), refractive power of the 12 lens group becomes small, so that a moving amount for focusing becomes large. Accordingly, variation in aberrations such as coma upon focusing becomes large, so that it is undesirable. In order to secure the effect of the present invention, it is preferable to set the upper limit of conditional expression (4) to 1.8. In order to secure the effect the present invention, it is preferable to set the lower limit of conditional expression (4) to 1.3.

In a zoom lens system with a vibration reduction function according to the present embodiment, the following conditional expressions (5) and (6) are preferably satisfied:

$$-2.0 < f32/f33 < -0.8 \quad (5)$$

$$0.1 < f3/f33 < 0.5 \quad (6)$$

where f3 denote a focal length of the third lens group, f32 denotes a focal length of the 32 lens group, and f33 denotes a focal length of the 33 lens group.

Conditional expression (5) defines an appropriate range of the focal length of the 32 lens group. When the ratio f32/f33 is equal to or exceeds the upper limit of conditional expression (5), negative refractive power of the 32 lens group becomes large, and a ratio of a moving amount of an image on the image plane to that of the 32 lens group upon carrying out vibration reduction becomes large. Accordingly, a tolerance of the driving error of the 32 lens group upon carrying out vibration reduction becomes small, so that it becomes difficult to carry out the driving control of the 32 lens group. Moreover, variation in aberrations such as coma upon carrying out vibration reduction becomes large, so that it is undesirable. On the other hand, when the ratio f32/f33 is equal to or falls below the lower limit of conditional expression (5), negative refractive power of the 32 lens group becomes small, and a ratio of a moving amount of the image on the image plane to that of the 32 lens group upon carrying out vibration reduction becomes small. Accordingly, the moving amount of the 32 lens group upon carrying out vibration reduction becomes large, so that the vibration reduction drive mechanism becomes large. Moreover, variation in aberrations such as coma upon carrying out vibration reduction becomes large, so that it is undesirable. In order to secure the effect of the present invention, it is preferable to set the lower limit of conditional expression (5) to −1.7. In order to secure the effect of the present invention, it is preferable to set the upper limit of conditional expression (5) to −1.0.

Conditional expression (6) defines an appropriate range of the focal length of the 33 lens group. When the ratio f3/f33 is equal to or exceeds the upper limit of conditional expression (6), positive refractive power of the 33 lens group becomes large, so that the total lens length of the zoom lens system becomes large, and it becomes difficult to correct distortion. On the other hand, when the ratio f3/f33 is equal to or falls below the lower limit of conditional expression (6), refractive power of the 33 lens group becomes small, and spherical aberration becomes excessively large in the negative direction, so that it becomes difficult to correct the aberration. In order to secure the effect of the present invention, it is preferable to set the lower limit of conditional expression (6) to 0.15. In order to secure the effect of the present invention, it is preferable to set the upper limit of conditional expression (6) to 0.30.

A method for correcting an image blur of a zoom lens system with a vibration reduction function according to the present embodiment includes steps of: providing a zoom lens system that includes, in order from an object, a first lens group having positive refractive power, a second lens group having negative refractive power, and a third lens group having positive refractive power; varying a focal length from a wide-angle end state to a telephoto end state by increasing a distance between the first lens group and the second lens group, and decreasing a distance between the second lens group and the third lens group; providing the third lens group that includes, in order from the object, a 31 lens group having positive refractive power, a 32 lens group having negative refractive power, and a 33 lens group; and correcting an image blur on an image plane upon generating a camera shake by moving only the 32 lens group in a direction perpendicular to an optical axis.

With applying the method for correcting an image blur by the 32 lens group with a small effective diameter, it becomes possible to realize miniaturizing the vibration reduction mechanism, so that it becomes possible to make the whole zoom lens system compact.

A method for varying a focal length of a zoom lens system with a vibration reduction function according to the present embodiment includes steps of: providing a zoom lens system that includes, in order from an object, a first lens group having positive refractive power, a second lens group having negative refractive power, and a third lens group having positive refractive power; providing the third lens group that includes, in order from the object, a 31 lens group having positive refractive power, a 32 lens group having negative refractive power, and a 33 lens group; correcting an image blur on an image plane upon generating a camera shake by moving only the 32 lens group in a direction perpendicular to an optical axis; and varying a focal length from a wide-angle end state to a telephoto end state by moving the first lens group and the third lens group to the object side such that a distance between the first lens group and the second lens group increases, and a distance between the second lens group and the third lens group decreases.

With applying such a method, it becomes possible to simplify the zoom mechanism and to make the whole zoom lens system compact.

A method for focusing a zoom lens system with a vibration reduction function according to the present embodiment includes steps of: providing the zoom lens system that includes, in order from an object, a first lens group having positive refractive power, a second lens group having negative refractive power, and a third lens group having positive refractive power; varying a focal length from a wide-angle end state to a telephoto end state by increasing a distance between the first lens group and the second lens group, and decreasing a distance between the second lens group and the third lens group; providing the third lens group that includes, in order from the object, a 31 lens group having positive refractive power, a 32 lens group having negative refractive power, and a 33 lens group; correcting an image blur on an image plane upon generating a camera shake by moving only the 32 lens group in a direction perpendicular to an optical axis; providing the first lens group that includes, in order from the object, an 11 lens group having positive refractive power, and a 12 lens group having positive refractive power; and carrying out focusing from infinity to a close object by moving only the 12 lens group to the object side.

With applying the method for focusing by the lightweight 12 lens group, it becomes possible to make the autofocus faster.

Each example of a zoom lens system with a vibration reduction function according to the present embodiment will be explained below with reference to accompanying drawings.

EXAMPLE 1

Figure 2:
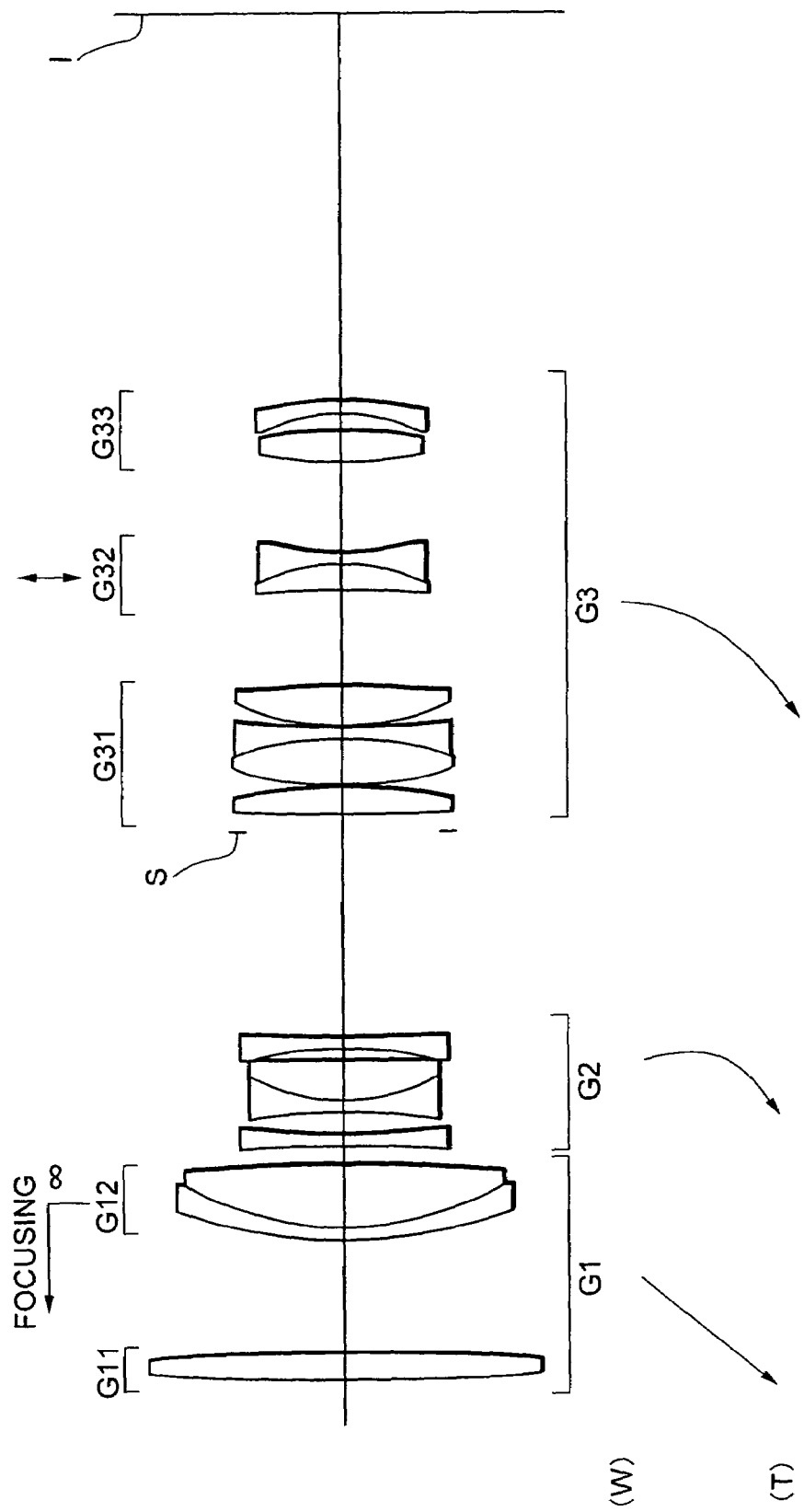
FIG. 2 is a diagram showing a lens configuration of a zoom lens system with a vibration reduction function according to Example 1.

FIG. 2 is a diagram showing a lens configuration of a zoom lens system with a vibration reduction function according to Example 1.

In FIG. 2, the zoom lens system with a vibration reduction function is composed of, in order from an object, a first lens group G1 having positive refractive power, a second lens group G2 having negative refractive power, and a third lens group G3 having positive refractive power. Upon zooming from a wide-angle end state (W) to a telephoto end state (T), the first lens group G1 and the third lens group G3 are moved to the object, and the second lens group G2 is moved at first to the image plane I then to the object such that a distance between the first lens group G1 and the second lens group G2 increases, and a distance between the second lens group G2 and the third lens group G3 decreases.

The first lens group G1 is composed of, in order from the object, an 11 lens group G11 having positive refractive power and a 12 lens group G12 having positive refractive power. The 11 lens group G11 is composed of a double convex positive lens. The 12 lens group G12 is composed of a cemented lens constructed by, in order from the object, a negative meniscus lens having a convex surface facing the object cemented with a double convex positive lens.

The second lens group G2 is composed of, in order from the object, a double concave negative lens, a cemented lens constructed by a double concave negative lens cemented with a positive meniscus lens having a convex surface facing the object, and a double concave negative lens.

The third lens group G3 is composed of, in order from the object, a 31 lens group G31 having positive refractive power, a 32 lens group G32 having negative refractive power, and a 33 lens group having positive refractive power. The 31 lens group G31 is composed of, in order from the object, a double convex positive lens, a cemented lens constructed by a double convex positive lens cemented with a double concave negative lens, and a double convex positive lens. The 32 lens group G32 is composed of a cemented lens constructed by, in order from the object, a positive meniscus lens having a convex surface facing the image plane I cemented with a double concave negative lens. The 33 lens group G33 is composed of, in order from the object, a double convex positive lens, and a negative meniscus lens having a concave surface facing the object.

An aperture stop S is disposed to the object side of the 31 lens group G31 and moved together with the third lens group G3 upon zooming from the wide-angle end state (W) to the telephoto end state (T).

Upon generating a camera shake, an image blur on the image plane I is corrected by moving only the 32 lens group G32 in the direction perpendicular to the optical axis.

Focusing from infinity to a close object is carried out by moving the 12 lens group G12 to the object side.

In a zoom lens system having a focal length of f, a vibration reduction coefficient, which is a ratio of a moving amount of an image on the image plane to that of the moving lens group perpendicularly to the optical axis upon correcting a camera shake, of K, in order to correct rotational camera shake of an angle of θ, the moving lens group for correcting the camera shake may be moved by the amount of (f·tan θ)/K perpendicularly to the optical axis. The relation is the same in the other examples explained later, so the duplicated explanations are to be omitted.

In the wide-angle end state (W) in Example 1, the vibration reduction coefficient K is 1.32, and the focal length is 56.1 (mm), so that the moving amount of the 32 lens group G32 for correcting a rotational camera shake of 0.30 degrees is 0.223 (mm). In the telephoto end state (T), the vibration reduction coefficient K is 1.96, and the focal length is 196.0(mm), so that the moving amount of the 32 lens group G32 for correcting a rotational camera shake of 0.15 degrees is 0.262(mm).

Various values associated with a zoom lens system with a vibration reduction function according to Example 1 are listed in Table 1. In [Specifications], f denotes a focal length of the zoom lens system, FNO denotes an f-number, and 2ω denotes an angle of view (unit: degree). In [Lens Data], the left most column "N" shows the lens surface number counted in order from the object side, the second column "r" shows a radius of curvature of the lens surface, the third column "d" shows a distance to the next lens surface, the fourth column "vd" shows Abbe number of the medium at d-line (wavelength λ=587.6 nm), and the fifth column "nd" shows refractive index of the medium at d-line (wavelength λ=587.6 nm). In the second column "r", "∞" denotes a plane surface. In the fifth column "nd", refractive index of the air nd=1.000000 is omitted. In [Variable Distances], the focal length f, a back focal length Bf, and variable distances are shown. In [Moving Amount for Focusing], δ12 denotes a moving amount of the 12 lens group G12 to the object side for focusing on an object locating a shooting distance of 1100 (mm). In [Values for Conditional Expressions], values for respective conditional expressions are shown. In each Table, W denotes a wide-angle end state, M denotes an intermediate focal length state, and T denotes a telephoto end state.

In the tables for various values, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used.

The explanation of reference symbols is the same in the other examples, so that duplicated explanations are omitted.

TABLE 1

[Specifications]

|  | W | M | T |
|---|---|---|---|
| f = | 56.1 | 99.9 | 196.0 |
| FNO = | 4.19 | 4.57 | 5.80 |
| 2ω = | 29.51 | 16.18 | 8.31° |

[Lens Data]

| N | r | d | vd | nd |
|---|---|---|---|---|
| 1 | 324.982 | 2.91 | 64.12 | 1.51680 |
| 2 | −324.982 | (d2) | | |
| 3 | 51.177 | 1.50 | 26.3 | 1.78470 |
| 4 | 34.944 | 6.24 | 70.45 | 1.48749 |
| 5 | −297.447 | (d5) | | |
| 6 | −255.962 | 1.20 | 49.61 | 1.77250 |
| 7 | 65.803 | 2.29 | | |
| 8 | −75.448 | 1.20 | 50.24 | 1.71999 |
| 9 | 20.575 | 4.02 | 25.43 | 1.80518 |
| 10 | 1808.935 | 1.18 | | |
| 11 | −45.335 | 1.20 | 49.61 | 1.77250 |
| 12 | 172.352 | (d12) | | |
| 13 | ∞ | 1.90 | Aperture Stop S | |
| 14 | 224.249 | 2.79 | 40.94 | 1.80610 |
| 15 | −53.880 | 0.20 | | |
| 16 | 32.076 | 4.87 | 82.56 | 1.49782 |
| 17 | −35.172 | 1.20 | 25.43 | 1.80518 |
| 18 | 104.595 | 0.20 | | |
| 19 | 26.174 | 4.00 | 58.89 | 1.51823 |
| 20 | −142.630 | 10.06 | | |
| 21 | −201.232 | 2.88 | 28.69 | 1.79504 |
| 22 | −19.318 | 1.10 | 44.79 | 1.74400 |
| 23 | 31.782 | 9.39 | | |
| 24 | 44.906 | 3.16 | 38 | 1.60342 |
| 25 | −54.119 | 1.82 | | |
| 26 | −18.132 | 1.40 | 37.17 | 1.83400 |
| 27 | −33.753 | (Bf) | | |

|  | W | M | T |
|---|---|---|---|
| [Variable Distances] | | | |
| f | 56.1 | 99.9 | 196 |
| d2 | 11.30 | 11.30 | 11.30 |
| d5 | 2.00 | 20.56 | 30.14 |
| d12 | 21.35 | 13.47 | 2.30 |
| Bf | 39.64 | 45.84 | 65.75 |
| [Moving Amount for Focusing] | | | |
| f | 56.1 | 99.9 | 196 |
| δ12 | 9.19 | 9.37 | 9.56 |

TABLE 1-continued

[Values for Conditional Expressions]

(1): d31/d32 = 1.07
(2): f1/f2 = −3.97
(3): f1/f3 = 2.92
(4): ft/f12 = 1.67
(5): f32/f33 = −1.33
(6): f3/f33 = 0.15

Figure 3A:
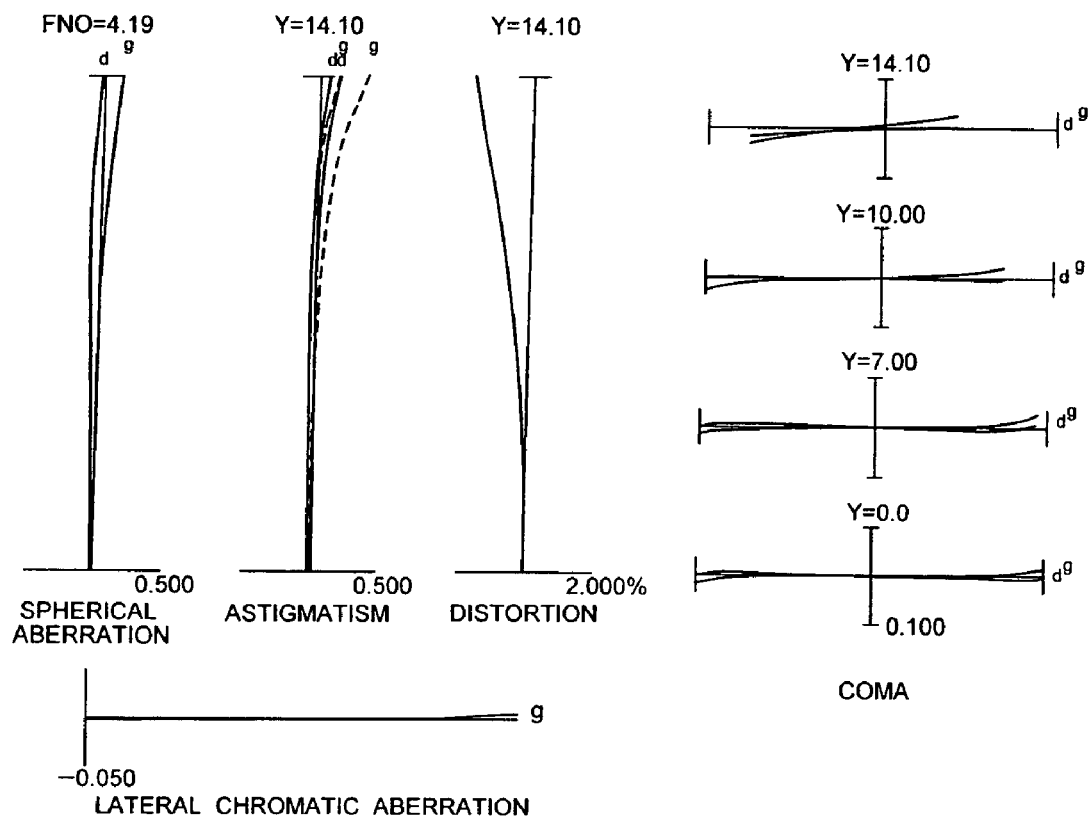
Figure 3B:
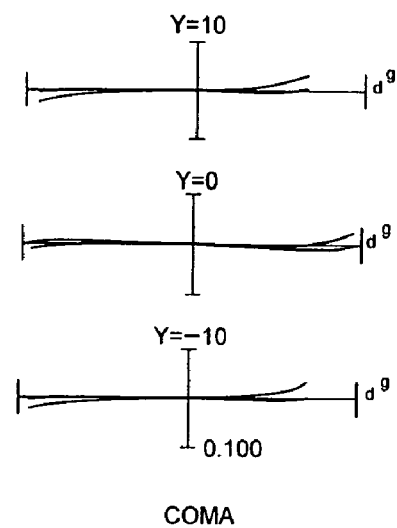
Figure 4:
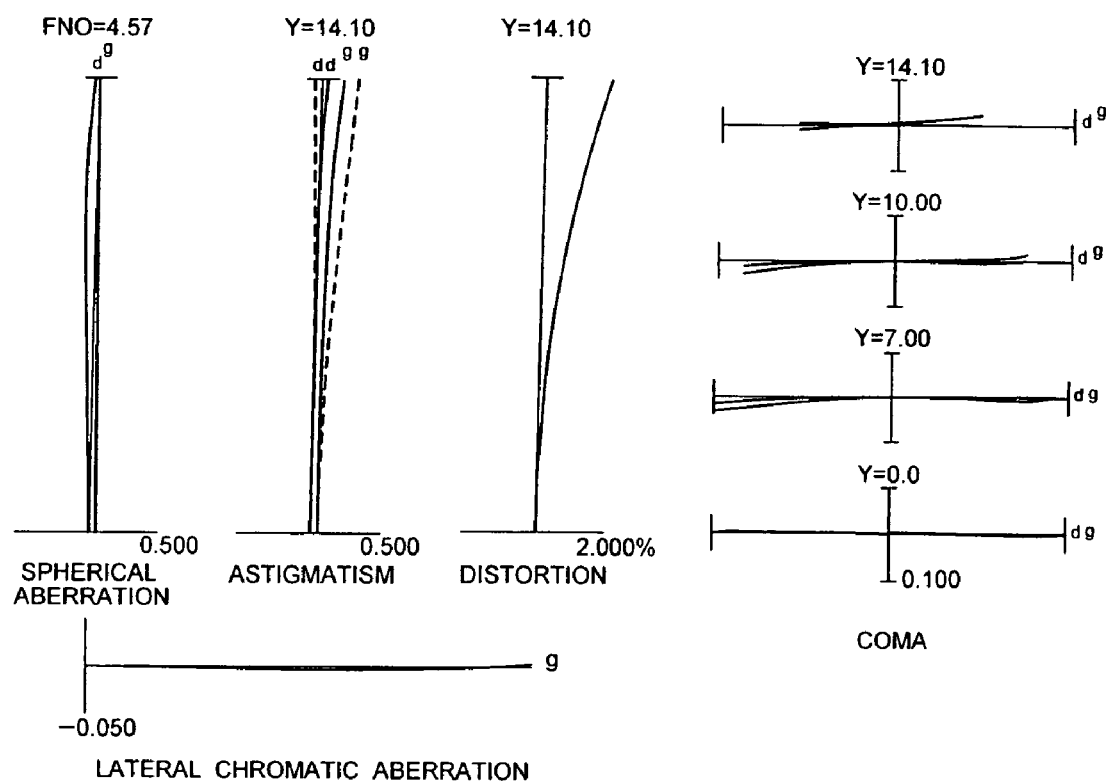
FIG. 4 is a graph showing various aberrations of the zoom lens system with a vibration reduction function according to Example 1 in an intermediate focal length state upon focusing on infinity.
Figure 5A:
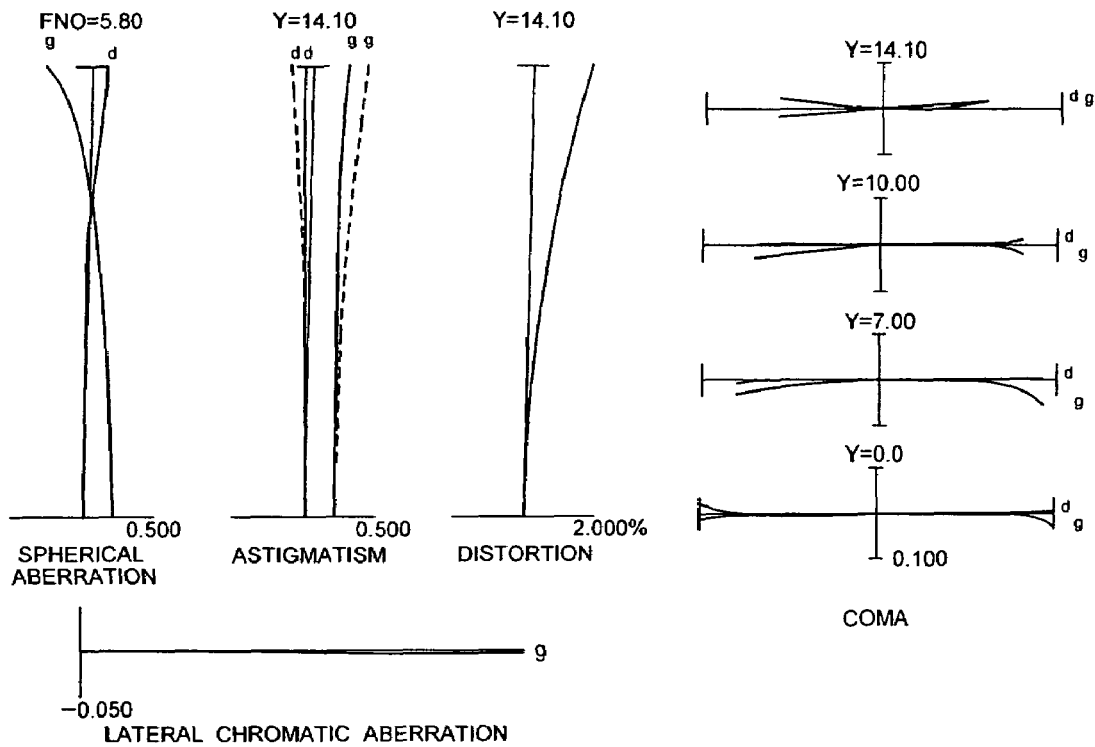
Figure 5B:
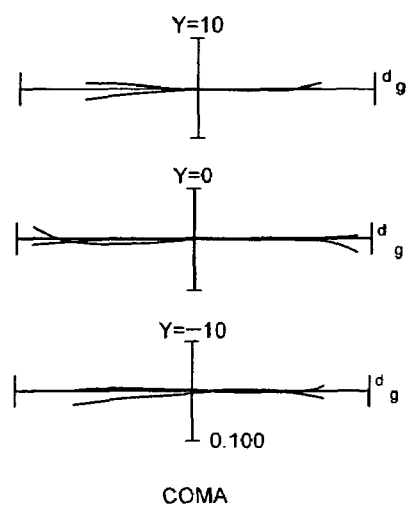

FIGS. 3A and 3B are graphs showing various aberrations of the zoom lens system with a vibration reduction function according to Example 1 in a wide-angle end state focusing on infinity in which FIG. 3A shows various aberrations without carrying out vibration reduction, and FIG. 3B shows coma upon correcting a rotational camera shake of 0.30 degrees. FIG. 4 is a graph showing various aberrations of the zoom lens system with a vibration reduction function according to Example 1 in an intermediate focal length state upon focusing on infinity. FIGS. 5A and 5B are graphs showing various aberrations of the zoom lens system with a vibration reduction function according to Example 1 in a telephoto end state focusing on infinity in which FIG. 5A shows various aberrations without carrying out vibration reduction, and FIG. 5B shows coma upon correcting a rotational camera shake of 0.15 degrees.

In respective graphs, FNO denotes an f-number, Y denotes an image height, d denotes aberration curve at d-line (wavelength λ=587.6 nm), and g denotes aberration curve at g-line (wavelength λ=435.8 nm). The above-described explanation regarding various aberration graphs is the same as the other examples.

As is apparent from the respective graphs, the zoom lens system with a vibration reduction function according to Example 1 shows superb optical performance as a result of good corrections to various aberrations in each focal length state.

EXAMPLE 2

FIG. 6 is a diagram showing a lens configuration of a zoom lens system with a vibration reduction function according to Example 2.

In FIG. 6, the zoom lens system with a vibration reduction function is composed of, in order from an object, a first lens group G1 having positive refractive power, a second lens group G2 having negative refractive power, and a third lens group G3 having positive refractive power. Upon zooming from a wide-angle end state (W) to a telephoto end state (T), the first lens group G1 and the third lens group G3 are moved to the object, and the second lens group G2 is moved at first to the image plane I then to the object such that a distance between the first lens group G1 and the second lens group G2 increases, and a distance between the second lens group G2 and the third lens group G3 decreases.

The first lens group G1 is composed of, in order from the object, an 11 lens group G11 having positive refractive power and a 12 lens group G12 having positive refractive power. The 11 lens group G11 is composed of a double convex positive lens. The 12 lens group G12 is composed of a cemented lens constructed by, in order from the object, a negative meniscus lens having a convex surface facing the object cemented with a double convex positive lens.

The second lens group G2 is composed of, in order from the object, a double concave negative lens, a cemented lens constructed by a double concave negative lens cemented with a positive meniscus lens having a convex surface facing the object, and a double concave negative lens.

The third lens group G3 is composed of, in order from the object, a 31 lens group G31 having positive refractive power, a 32 lens group G32 having negative refractive power, and a 33 lens group having positive refractive power. The 31 lens group G31 is composed of, in order from the object, a double convex positive lens, a cemented lens constructed by a double convex positive lens cemented with a double concave negative lens, and a double convex positive lens. The 32 lens group G32 is composed of, in order from the object, a cemented lens constructed by a positive meniscus lens having a convex surface facing the image plane I cemented with a double concave negative lens. The 33 lens group G33 is composed of, in order from the object, a double convex positive lens, and a negative meniscus lens having a concave surface facing the object.

An aperture stop S is disposed to the object side of the 31 lens group G31 and moved together with the third lens group G3 upon zooming from the wide-angle end state (W) to the telephoto end state (T).

Upon generating a camera shake, an image blur on the image plane I is corrected by moving only the 32 lens group G32 in the direction perpendicular to the optical axis.

Focusing from infinity to a close object is carried out by moving the 12 lens group G12 to the object side.

In the wide-angle end state (W) in Example 2, the vibration reduction coefficient K is 1.27, and the focal length is 56.1 (mm), so that the moving amount of the 32 lens group G32 for correcting a rotational camera shake of 0.30 degrees is 0.232 (mm). In the telephoto end state (T), the vibration reduction coefficient K is 1.95, and the focal length is 196.0 (mm), so that the moving amount of the 32 lens group G32 for correcting a rotational camera shake of 0.15 degrees is 0.263 (mm).

Various values associated with a zoom lens system with a vibration reduction function according to Example 2 are listed in Table 2.

TABLE 2

[Specifications]

|  | W | M | T |
| --- | --- | --- | --- |
| f = | 56.1 | 99.9 | 196.0 |
| FNO = | 4.10 | 4.51 | 5.81 |
| 2ω = | 29.50 | 16.17 | 8.31° |

[Lens Data]

| N | r | d | vd | nd |
| --- | --- | --- | --- | --- |
| 1 | 258.915 | 3.22 | 64.12 | 1.5168 |
| 2 | −258.915 | (d2) | | |
| 3 | 50.334 | 1.50 | 23.78 | 1.84666 |
| 4 | 35.942 | 5.66 | 70.45 | 1.48749 |
| 5 | −352.277 | (d5) | | |
| 6 | −139.909 | 1.40 | 49.61 | 1.7725 |
| 7 | 67.620 | 2.05 | | |
| 8 | −165.337 | 1.40 | 50.88 | 1.65844 |
| 9 | 18.503 | 4.17 | 25.43 | 1.80518 |
| 10 | 165.033 | 1.46 | | |
| 11 | −41.774 | 1.40 | 49.61 | 1.7725 |
| 12 | 96.800 | (d12) | | |
| 13 | ∞ | 1.90 | Aperture Stop S | |
| 14 | 212.407 | 2.94 | 39.57 | 1.8044 |
| 15 | −48.250 | 0.20 | | |
| 16 | 31.747 | 5.13 | 82.56 | 1.49782 |
| 17 | −35.445 | 1.40 | 25.43 | 1.80518 |
| 18 | 81.737 | 0.20 | | |
| 19 | 25.799 | 3.78 | 58.89 | 1.51823 |

TABLE 2-continued

| | | | | |
|---|---|---|---|---|
| 20 | −183.131 | 11.14 | | |
| 21 | −211.966 | 2.87 | 28.69 | 1.79504 |
| 22 | −19.531 | 1.10 | 44.79 | 1.744 |
| 23 | 31.174 | 8.24 | | |
| 24 | 42.330 | 3.57 | 38 | 1.60342 |
| 25 | −39.224 | 1.44 | | |
| 26 | −19.047 | 1.40 | 37.17 | 1.834 |
| 27 | −41.829 | (Bf) | | |

| | W | M | T |
|---|---|---|---|
| [Variable Distances] | | | |
| f | 56.1 | 99.9 | 196 |
| d2 | 11.89 | 11.89 | 11.89 |
| d5 | 2.00 | 18.75 | 27.42 |
| d12 | 20.56 | 12.95 | 2.45 |
| Bf | 39.00 | 45.84 | 66.89 |
| [Moving Amount for Focusing] | | | |
| f | 56.1 | 99.9 | 196 |
| δ12 | 8.66 | 8.81 | 9.00 |

[Values for Conditional Expressions]

(1): d31/d32 = 1.35
(2): f1/f2 = −4.03
(3): f1/f3 = 2.86
(4): ft/f12 = 1.63
(5): f32/f33 = −1.35
(6): f3/f33 = 0.21

Figure 7A:
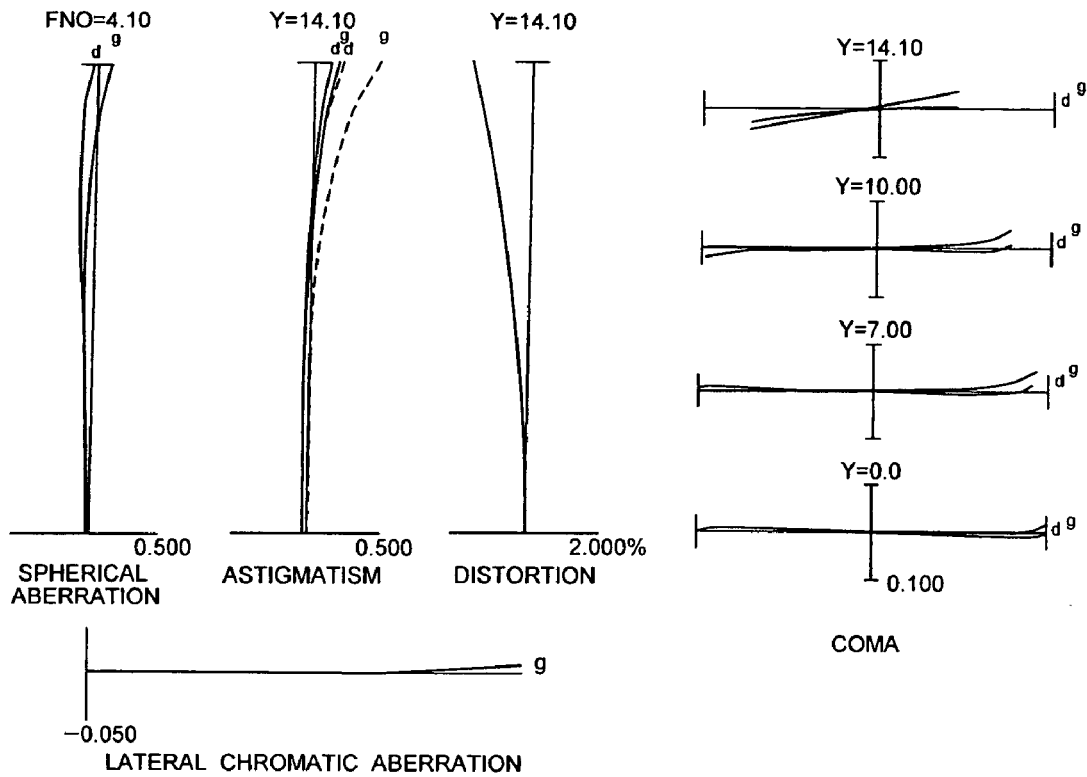
Figure 7B:
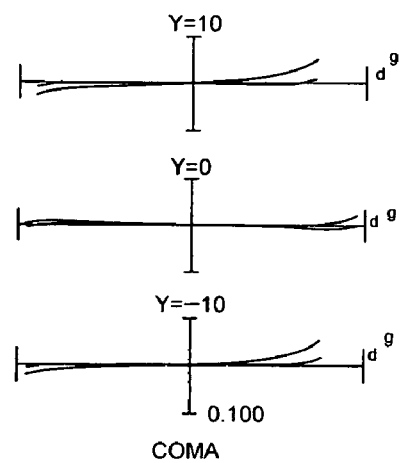
Figure 8:
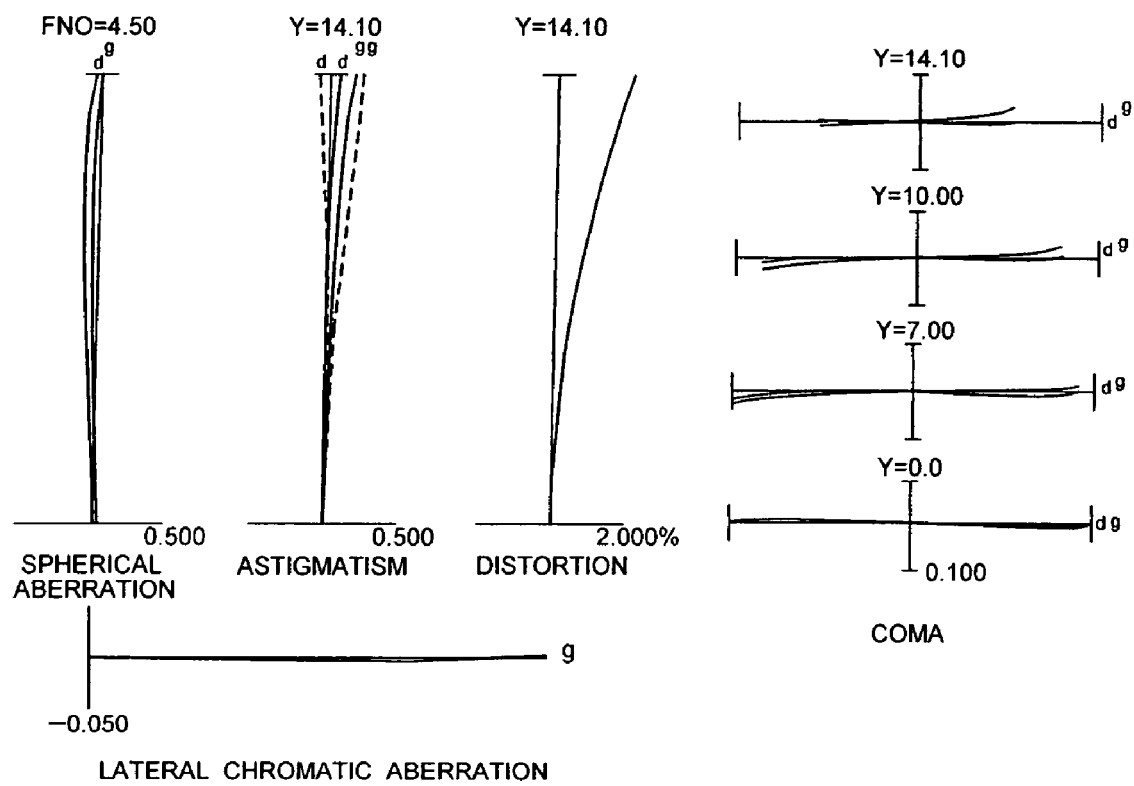
FIG. 8 is a graph showing various aberrations of the zoom lens system with a vibration reduction function according to Example 2 in an intermediate focal length state upon focusing on infinity.
Figure 9A:
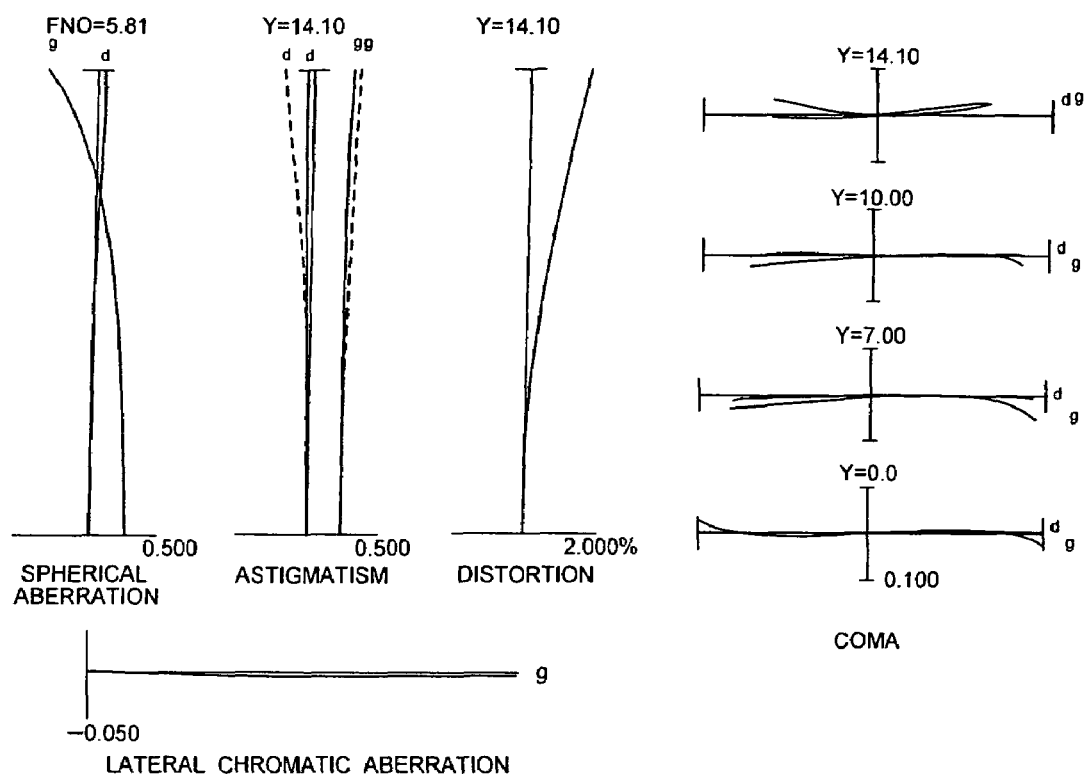
Figure 9B:
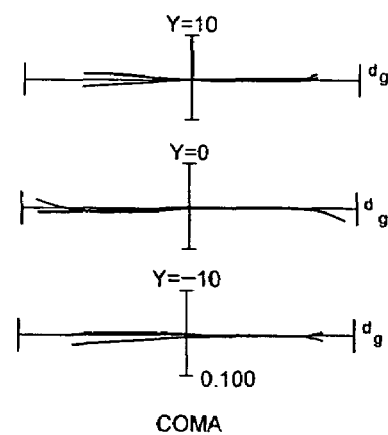

FIGS. 7A and 7B are graphs showing various aberrations of the zoom lens system with a vibration reduction function according to Example 2 in a wide-angle end state focusing on infinity in which FIG. 7A shows various aberrations without carrying out vibration reduction, and FIG. 7B shows coma upon correcting a rotational camera shake of 0.30 degrees. FIG. 8 is a graph showing various aberrations of the zoom lens system with a vibration reduction function according to Example 2 in an intermediate focal length state upon focusing on infinity. FIGS. 9A and 9B are graphs showing various aberrations of the zoom lens system with a vibration reduction function according to Example 2 in a telephoto end state focusing on infinity in which FIG. 9A shows various aberrations without carrying out vibration reduction, and FIG. 9B shows coma upon correcting a rotational camera shake of 0.15 degrees.

As is apparent from the respective graphs, the zoom lens system with a vibration reduction function according to Example 2 shows superb optical performance as a result of good corrections to various aberrations in each focal length state.

EXAMPLE 3

Figure 10:
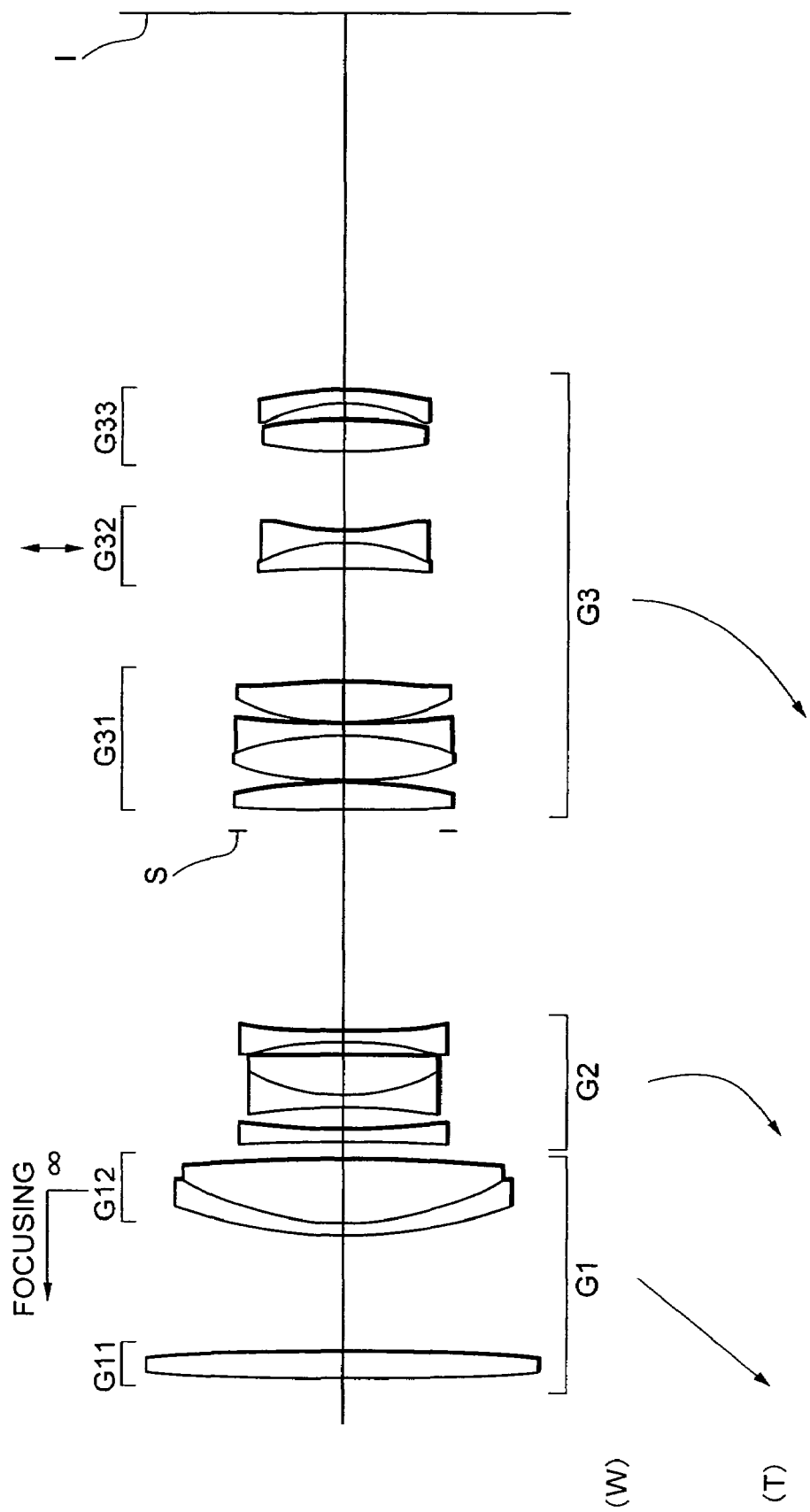
FIG. 10 is a diagram showing a lens configuration of a zoom lens system with a vibration reduction function according to Example 3.

FIG. 10 is a diagram showing a lens configuration of a zoom lens system with a vibration reduction function according to Example 3.

In FIG. 10, the zoom lens system with a vibration reduction function is composed of, in order from an object, a first lens group G1 having positive refractive power, a second lens group G2 having negative refractive power, and a third lens group G3 having positive refractive power. Upon zooming from a wide-angle end state (W) to a telephoto end state (T), the first lens group G1 and the third lens group G3 are moved to the object, and the second lens group G2 is moved at first to the image plane I then to the object such that a distance between the first lens group G1 and the second lens group G2 increases, and a distance between the second lens group G2 and the third lens group G3 decreases.

The first lens group G1 is composed of, in order from the object, an 11 lens group G11 having positive refractive power and a 12 lens group G12 having positive refractive power. The 11 lens group G11 is composed of a double convex positive lens. The 12 lens group G12 is composed of a cemented lens constructed by, in order from the object, a negative meniscus lens having a convex surface facing the object cemented with a double convex positive lens.

The second lens group G2 is composed of, in order from the object, a double concave negative lens, a cemented lens constructed by a double concave negative lens cemented with a positive meniscus lens having a convex surface facing the object, and a double concave negative lens.

The third lens group G3 is composed of, in order from the object, a 31 lens group G31 having positive refractive power, a 32 lens group G32 having negative refractive power, and a 33 lens group having positive refractive power. The 31 lens group G31 is composed of, in order from the object, a double convex positive lens, a cemented lens constructed by a double convex positive lens cemented with a double concave negative lens, and a double convex positive lens. The 32 lens group G32 is composed of, in order from the object, a cemented lens constructed by a positive meniscus lens having a convex surface facing the image plane I cemented with a double concave negative lens. The 33 lens group G33 is composed of, in order from the object, a double convex positive lens, and a negative meniscus lens having a concave surface facing the object.

An aperture stop S is disposed to the object side of the 31 lens group G31 and moved together with the third lens group G3 upon zooming from the wide-angle end state (W) to the telephoto end state (T).

Upon generating a camera shake, an image blur on the image plane I is corrected by moving only the 32 lens group G32 in the direction perpendicular to the optical axis.

Focusing from infinity to a close object is carried out by moving the 12 lens group G12 to the object side.

In the wide-angle end state (W) in Example 3, the vibration reduction coefficient K is 1.26, and the focal length is 56.1 (mm), so that the moving amount of the 32 lens group G32 for correcting a rotational camera shake of 0.30 degrees is 0.233 (mm). In the telephoto end state (T), the vibration reduction coefficient K is 1.95, and the focal length is 196.0 (mm), so that the moving amount of the 32 lens group G32 for correcting a rotational camera shake of 0.15 degrees is 0.263 (mm).

Various values associated with a zoom lens system with a vibration reduction function according to Example 3 are listed in Table 3.

TABLE 3

| [Specifications] | | | |
|---|---|---|---|
| | W | M | T |
| f = | 56.1 | 99.9 | 196.0 |
| FNO = | 4.10 | 4.51 | 5.84 |
| 2ω = | 29.56 | 16.20 | 8.32° |

| [Lens Data] | | | | |
|---|---|---|---|---|
| N | r | d | νd | nd |
| 1 | 284.154 | 3.00 | 64.12 | 1.5168 |
| 2 | −284.154 | (d2) | | |
| 3 | 50.204 | 1.50 | 23.78 | 1.84666 |
| 4 | 35.983 | 5.60 | 70.45 | 1.48749 |

TABLE 3-continued

| | | | | |
|---|---|---|---|---|
| 5 | −309.892 | (d5) | | |
| 6 | −145.698 | 1.20 | 49.61 | 1.7725 |
| 7 | 71.657 | 2.10 | | |
| 8 | −118.261 | 1.20 | 50.88 | 1.65844 |
| 9 | 19.374 | 4.10 | 25.43 | 1.80518 |
| 10 | 222.739 | 1.60 | | |
| 11 | −44.150 | 1.20 | 49.61 | 1.7725 |
| 12 | 95.930 | (d12) | | |
| 13 | ∞ | 1.90 | | Aperture Stop S |
| 14 | 214.324 | 2.90 | 39.57 | 1.8044 |
| 15 | −51.111 | 0.20 | | |
| 16 | 32.738 | 5.30 | 82.56 | 1.49782 |
| 17 | −35.981 | 1.10 | 25.43 | 1.80518 |
| 18 | 92.741 | 0.20 | | |
| 19 | 27.010 | 3.80 | 58.89 | 1.51823 |
| 20 | −170.048 | 11.90 | | |
| 21 | −256.270 | 2.80 | 28.69 | 1.79504 |
| 22 | −20.780 | 1.10 | 44.79 | 1.744 |
| 23 | 30.569 | 8.10 | | |
| 24 | 42.060 | 3.50 | 38 | 1.60342 |
| 25 | −43.061 | 1.50 | | |
| 26 | −19.441 | 1.10 | 37.17 | 1.834 |
| 27 | −40.427 | (Bf) | | |

| | W | M | T |
|---|---|---|---|
| [Variable Distances] | | | |
| f | 56.1 | 99.9 | 196 |
| d2 | 11.89 | 11.89 | 11.89 |
| d5 | 2.00 | 18.94 | 27.64 |
| d12 | 21.21 | 13.30 | 2.47 |
| Bf | 39.00 | 45.91 | 67.30 |
| [Moving Amount for Focusing] | | | |
| f | 56.1 | 99.9 | 196 |
| δ12 | 8.66 | 8.81 | 9.00 |

[Values for Conditional Expressions]

(1): d31/d32 = 1.47
(2): f1/f2 = −3.95
(3): f1/f3 = 2.84
(4): ft/f12 = 1.67
(5): f32/f33 = −1.33
(6): f3/f33 = 0.22

Figure 11A:
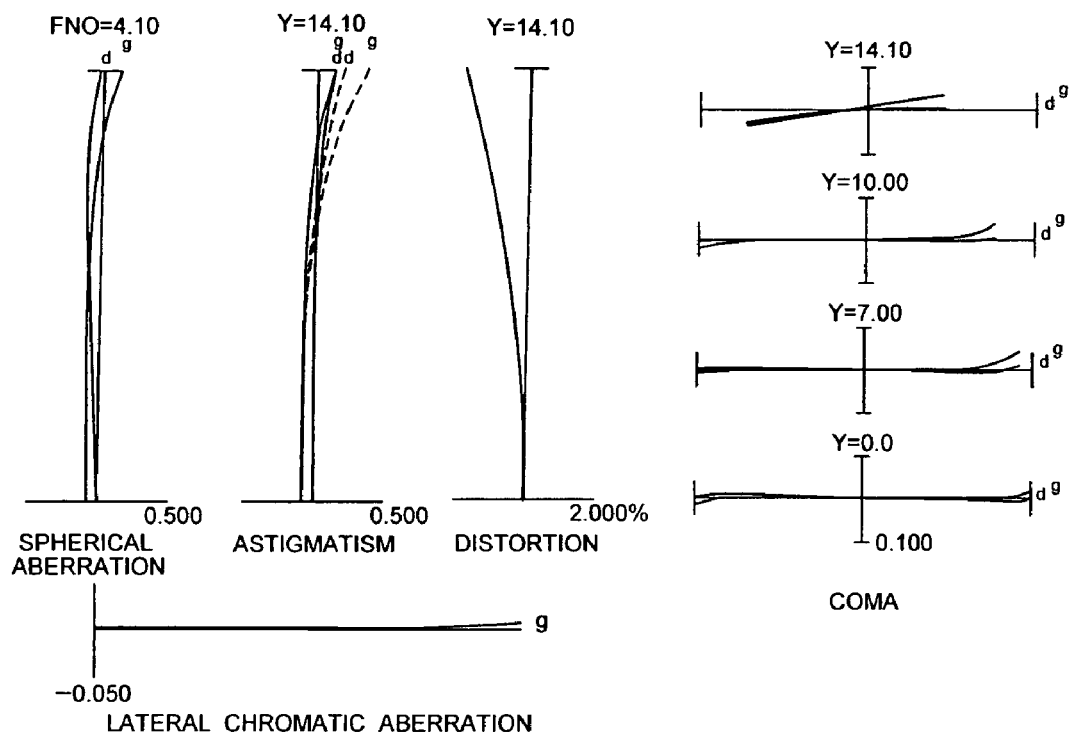
Figure 11B:
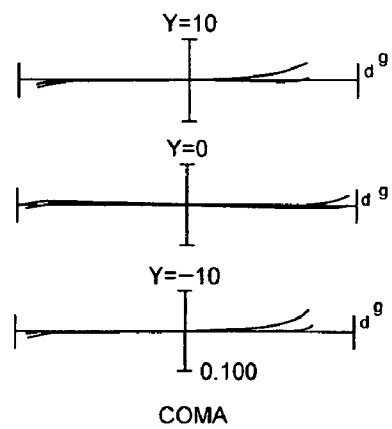
Figure 12:
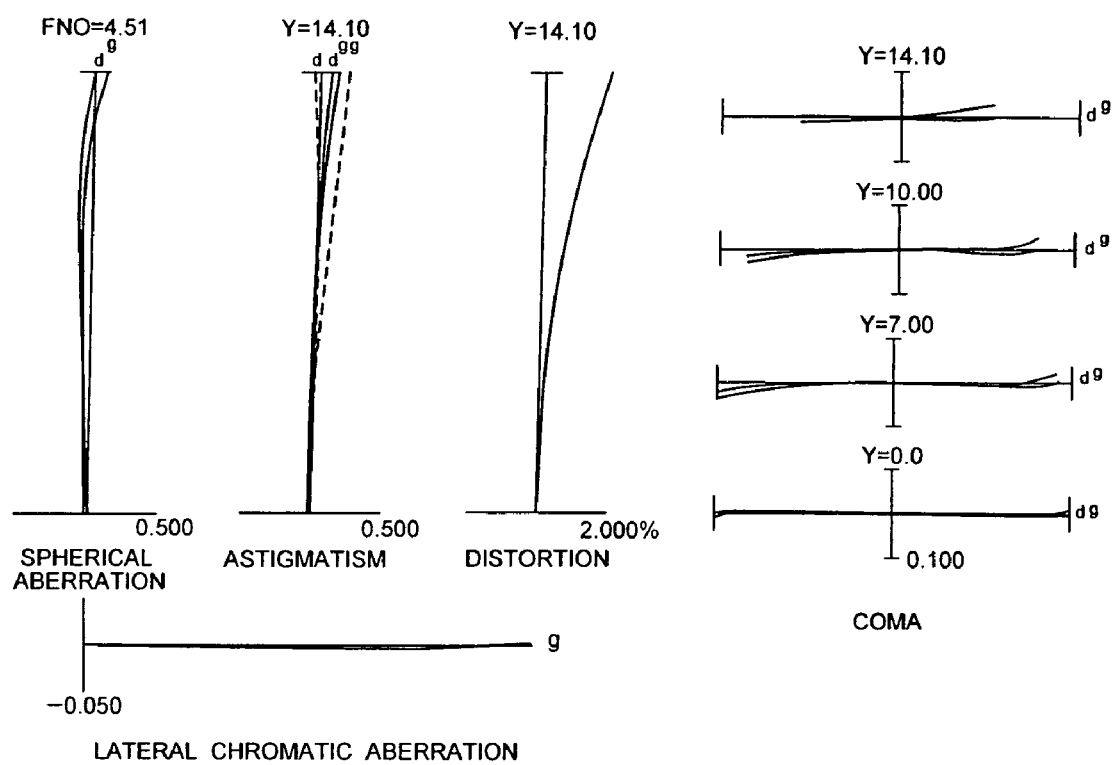
FIG. 12 is a graph showing various aberrations of the zoom lens system with a vibration reduction function according to Example 3 in an intermediate focal length state upon focusing on infinity.
Figure 13A:
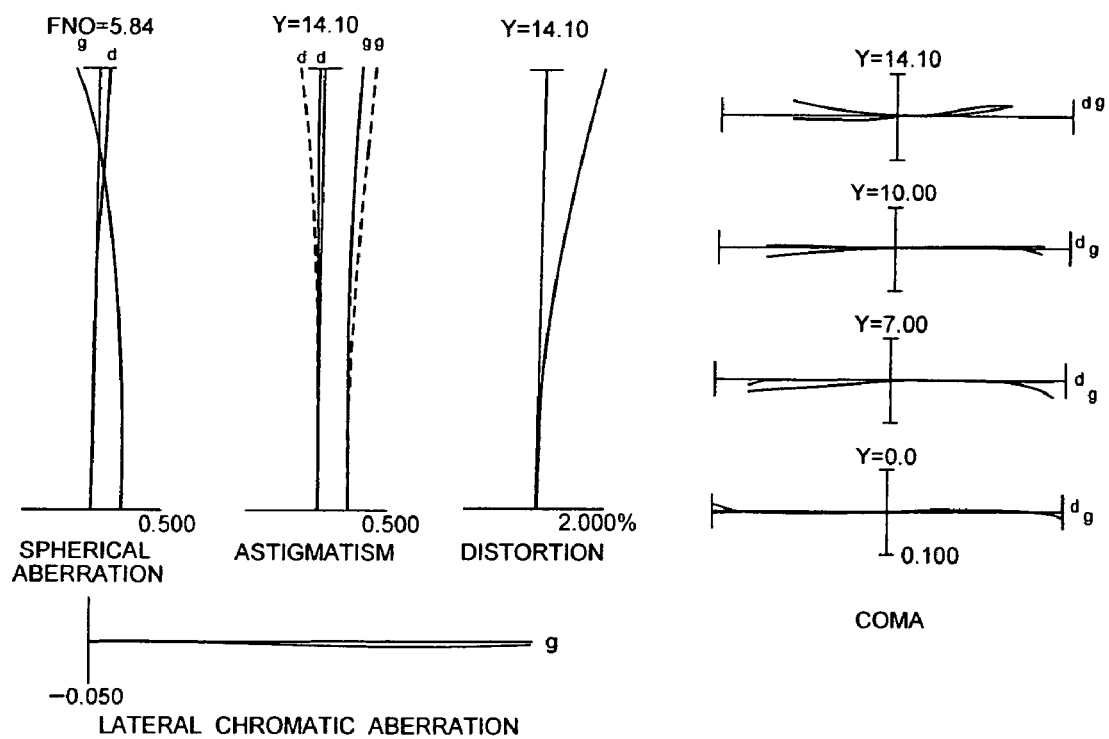
Figure 13B:
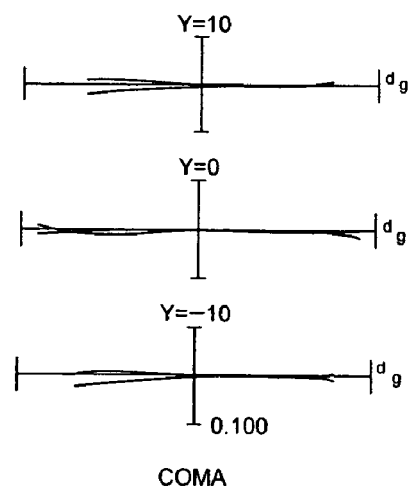

FIGS. 11A and 11B are graphs showing various aberrations of the zoom lens system with a vibration reduction function according to Example 3 in a wide-angle end state focusing on infinity in which FIG. 11A shows various aberrations without carrying out vibration reduction, and FIG. 11B shows coma upon correcting a rotational camera shake of 0.30 degrees. FIG. 12 is a graph showing various aberrations of the zoom lens system with a vibration reduction function according to Example 3 in an intermediate focal length state upon focusing on infinity. FIGS. 13A and 13B are graphs showing various aberrations of the zoom lens system with a vibration reduction function according to Example 3 in a telephoto end state focusing on infinity in which FIG. 13A shows various aberrations without carrying out vibration reduction, and FIG. 13B shows coma upon correcting a rotational camera shake of 0.15 degrees.

As is apparent from the respective graphs, the zoom lens system with a vibration reduction function according to Example 3 shows superb optical performance as a result of good corrections to various aberrations in each focal length state.

As described above, the present invention makes it possible to provide a compact zoom lens system with a vibration reduction function suitable for a single-lens reflex camera using a solid-state imaging device, having a zoom ratio of about 3.5 or more, and an angle of view of 29 degrees or more in a wide-angle end state.

In each Example, any lens of each lens group may be replaced by an aspherical lens. With using an aspherical lens, it becomes possible to preferably correct various aberrations such as spherical aberration and coma.

In each Example, at least one lens of each lens group may be replaced by a plastic lens. With using a plastic lens, it becomes possible to lower the manufacturing cost and the weight thereof.

It is needless to say that although a zoom lens system with a three-lens-group configuration is shown as each Example of the present invention, a zoom lens system simply added by a lens group to a three-lens-group configuration is included in the spirit of the present invention. Moreover, in the configuration of each lens group, a lens group simply added by additional lens elements to the lens group shown in each Example is included in the spirit or scope of the present invention.

Additional advantages and modifications will readily occur to those skilled in the art. Therefore, the invention in its broader aspect is not limited to the specific details, and representative devices shown and described herein. Accordingly, various modifications may be made without departing from the spirit or scope of the general inventive concept as defined by the appended claims and their equivalents.

What is claimed is:

1. A zoom lens system with a vibration reduction function comprising, in order from an object:
   a first lens group having positive refractive power;
   a second lens group having negative refractive power; and
   a third lens group having positive refractive power,
   upon zooming from a wide-angle end state to a telephoto end state, a distance between the first lens group and the second lens group increasing, and a distance between the second lens group and the third lens group decreasing,
   the third lens group comprising, in order from the object, a first lens sub-group having positive refractive power, a second lens sub-group having negative refractive power, and a third lens sub-group,
   only the second lens sub-group being moved in a direction perpendicular to an optical axis for correcting an image blur on an image plane upon generating a camera shake, and
   the following conditional expressions being satisfied:

$$0.7 < d31/d32 < 1.69$$

$$-2.0 < f32/f33 < -0.8$$

where d31 denotes a distance between the first lens sub-group and the second lens sub-group, d32 denotes a distance between the second lens sub-group and the third lens sub-group, f32 denotes a focal length of the second lens sub-group, and f33 denotes a focal length of the third lens sub-group.

2. The zoom lens system with a vibration reduction function according to claim 1, wherein upon zooming from the wide-angle end state to the telephoto end state, the first and third lens groups are moved to an object side.

3. The zoom lens system with a vibration reduction function according to claim 2, wherein the following conditional expression is satisfied:

$$-4.5 < f1/f2 < -2.0$$

where f1 denotes a focal length of the first lens group, and f2 denotes a focal length of the second lens group.

4. The zoom lens system with a vibration reduction function according to claim 3, wherein the following conditional expression is satisfied:

$$2.0 < f1/f3 < 4.0$$

where f1 denotes a focal length of the first lens group, and f3 denotes a focal length of the third lens group.

5. The zoom lens system with a vibration reduction function according to claim 4, wherein the first lens group comprises, in order from the object, a first lens sub-group having positive refractive power, and a second lens sub-group having positive refractive power, and focusing from infinity to a close object is carried out by moving only the second lens sub-group of the first lens group to the object side, and the following conditional expression is satisfied:

$$1.1 < ft/f12 < 2.0$$

where ft denotes a focal length of the zoom lens system in the telephoto end state, and f12 denotes a focal length of the second lens sub-group of the first lens group.

6. The zoom lens system with a vibration reduction function according to claim 5, wherein the following conditional expression is satisfied:

$$0 < f3/f33 < 0.5$$

where f3 denotes a focal length of the third lens group, and f33 denotes a focal length of the third lens sub-group of the third lens group.

7. The zoom lens system with a vibration reduction function according to claim 1, wherein the following conditional expression is satisfied:

$$-4.5 < f1/f2 < -2.0$$

where f1 denotes a focal length of the first lens group, and f2 denotes a focal length of the second lens group.

8. The zoom lens system with a vibration reduction function according to claim 1, wherein the following conditional expression is satisfied:

$$2.0 < f1/f3 < 4.0$$

where f1 denotes a focal length of the first lens group, and f3 denotes a focal length of the third lens group.

9. The zoom lens system with a vibration reduction function according to claim 1, wherein the first lens group comprises, in order from the object, a first lens sub-group having positive refractive power, and a second lens sub-group having positive refractive power, and focusing from infinity to a close object is carried out by moving only the second lens sub-group of the first lens group to the object side, and the following conditional expression is satisfied:

$$1.1 < ft/f12 < 2.0$$

where ft denotes a focal length of the zoom lens system in the telephoto end state, and f12 denotes a focal length of the second lens sub-group of the first lens group.

10. The zoom lens system with a vibration reduction function according to claim 1, wherein the following conditional expression is satisfied:

$$0 < f3/f33 < 0.5$$

where f3 denotes a focal length of the third lens group, and f33 denotes a focal length of the third lens sub-group.

11. The zoom lens system with a vibration reduction function according to claim 1, wherein an aperture stop is disposed in the vicinity of the third lens group.

12. The zoom lens system with a vibration reduction function according to claim 1, wherein each lens surface is formed by a spherical surface or a plane surface.

13. An imaging apparatus including a zoom lens system which has a vibration reduction function and which comprises, in order from an object:

a first lens group having positive refractive power;
a second lens group having negative refractive power; and
a third lens group having positive refractive power,
upon zooming from a wide-angle end state to a telephoto end state, a distance between the first lens group and the second lens group increasing, and a distance between the second lens group and the third lens group decreasing,
the third lens group comprising, in order from the object, first lens sub-group having positive refractive power, a second lens sub-group having negative refractive power, and a third lens sub-group,
only the second lens sub-group being moved in a direction perpendicular to an optical axis for correcting an image blur on an image plane upon generating a camera shake, and
the following conditional expressions being satisfied:

$$0.7 < d31/d32 < 1.69$$

$$-2.0 < f32/f33 < 0.8$$

where d31 denotes a distance between the first lens sub-group and the second lens sub-group, d32 denotes a distance between the second lens sub-group and the third lens sub-group, f32 denotes a focal length of the second lens sub-group, and f33 denotes a focal length of the third lens sub-group.

14. A method for forming an image of an object, varying a focal length, and correcting an image blur of a zoom lens system with a vibration reduction function, the method comprising steps of:

providing a zoom lens system that includes, in order from an object, a first lens group having positive refractive power, a second lens group having negative refractive power, and a third lens group having positive refractive power;
varying a focal length from a wide-angle end state to a telephoto end state by increasing a distance between the first lens group and the second lens group, and decreasing a distance between the second lens group and the third lens group;
providing the third lens group that comprises, in order from the object, first lens sub-group having positive refractive power, a second lens sub-group having negative refractive power, and a third lens sub-group;
satisfying the following conditional expressions:

$$0.7 < d31/d32 < 1.69$$

$$-2.0 < f32/f33 < 0.8$$

where d31 denotes a distance between the first lens sub-group and the second lens sub-group, d32 denotes a distance between the second lens sub-group and the third lens sub-group, f32 denotes a focal length of the second lens sub-group, and f33 denotes a focal length of the third lens sub-group; and
correcting an image blur on an image plane upon generating a camera shake by moving only the second lens sub-group in a direction perpendicular to an optical axis.

15. The method according to claim 14, further comprising a step of:

moving the first and third lens groups to an object side upon zooming from the wide-angle end state to the telephoto end state.

16. The method according to claim 14, further comprising a step of:

satisfying the following conditional expression:

$$-4.5 < f1/f2 < -2.0$$

where f1 denotes a focal length of the first lens group, and f2 denotes a focal length of the second lens group.

17. The method according to claim 14, further comprising a step of:

satisfying the following conditional expression:

$$2.0 < f1/f3 < 4.0$$

where f1 denotes a focal length of the first lens group, and f3 denotes a focal length of the third lens group.

* * * * *